LOW IMPEDANCE SWITCHING CIRCUIT UTILIZING ZENER DIODE GATE
Filed July 11, 1960
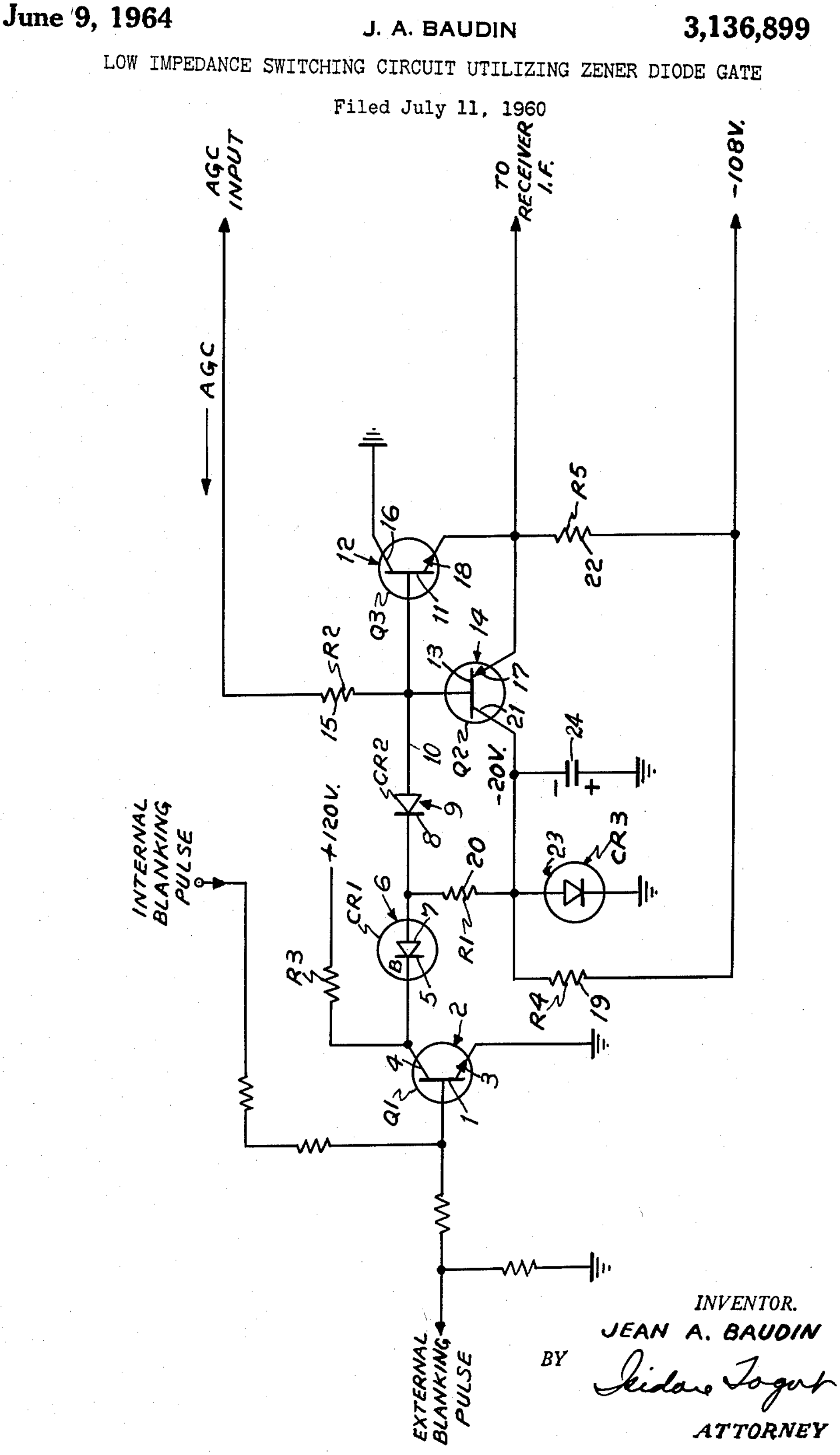
INVENTOR.
JEAN A. BAUDIN
BY Isidore Togut
ATTORNEY 3,136,899
Patented June 9, 1964

3,136,899

LOW IMPEDANCE SWITCHING CIRCUIT UTILIZING ZENER DIODE GATE

Jean A. Baudin, Montclair, N.J., assignor to International Telephone and Telegraph Corporation, Nutley, N.J., a corporation of Maryland Filed July 11, 1960, Ser. No. 42,025
6 Claims. (Cl. 307—88.5)

This invention relates to switching circuits and more particularly to a low impedance switching circuit having a minimum amount of interaction between the input circuits.

In certain navigation systems, such as Tacan, the blanking pulse used to disable the receiver during the operation of the transmitter and the AGC signals are fed into a common circuit, the output of which is coupled to the IF amplifier. This circuit will pass the blanking signals to the intermediate frequency amplifier by way of the AGC line to the intermediate frequency amplifier thereby blanking out the receiver when required. In the absence of the blanking signals, the AGC voltages will bias the intermediate frequency amplifier stages. In Tacan, the blanking pulse is added in series with the AGC voltage to blank off the receiver. This is done by impressing the blanking pulse across the winding of a transformer which is in series with the AGC voltage. However, such addition of voltages results in a high impedance and interaction between the two signals which are undesirable. Furthermore, it is not possible to control with any degree of certainty the width of the blanking pulse. Since the power of the blanking pulse may be 40 watts peak, out of a relatively small transformer, the rise and decay of the pulse time is distorted. The power of the blanking pulse is relatively large because in order to maintain a low impedance of the transformer, 10 ohms, with a 20 volt input blanking pulse, a current therein of two amperese is obtained.

It is an object of this invention to provide a switching circuit wherein the input signals are isolated from each other and a low impedance is maintained throughout.

It is a further object to provide a switching circuit that has inexpensive components and requires no reactive elements.

A feature of this invention is a switching circuit that is responsive to first and second signals and comprises input means, output means and means coupling the first signals to the input means: the second signals being coupled to the input of the output means. Switching means couple the input means to the output means of the circuit whereby a first output is produced from the output means in response to the application of the first signals to the input means and the second output is produced from the output means responsive to the second signals in the absence of the first signals.

A further feature is that the input means comprises a first transistor and the output means comprise second and third transistors and the switching means couple the output of the first transistor to the inputs of the second and third transistors which are connected in common and to which inputs is connected the second signals. A first output is produced at the output of the second and third transistors, which are coupled in common, in response to the application of the first signal to the first transistor and a second output is produced from the output of the second transistors responsive to the second signals in the absence of the first signals.

The above-mentioned and other features and objects of this invention will become more apparent by reference to the following description taken in conjunction with the sole figure of this drawing which is a schematic diagram of the embodiment of this invention.

Referring now to the figure of this drawing, an internal blanking pulse is coupled to the base 1 of a transistor 2. An external blanking pulse signal is likewise coupled to base 1 of transistor 2. The emitter 3 of transistor 2 is grounded. A source of postive potential, in this case, +120 volts, is coupled to the collector 4 of transistor 2. The output of transistor 2 from the collector 4 is coupled to the cathode 5 of a zener diode 6. The anode 7 of zener diode 6 is coupled to the cathode 8 of a diode 9 and the anode 10 of diode 9 is coupled to the base 11 of a transistor 12 and to the base 13 of transistor 14. Likewise, the AGC input signal from the receiver (not shown) is coupled to the base elements 11 and 13 by resistor 15. The collector 16 of transistor 12 is grounded. The emitter 17 of transistor 14 and the emitter 18 of transistor 12 are coupled in common and the output from transistors 12 and 14 is taken therefrom. A source of negative potential, −108 volts, is coupled by resistors 19 and 20 to the junction of anode 7 of zener diode 6 and cathode 8 of diode 9, and also to the collector 21 of transistor 14. The −108 volts is also coupled to the emitters 17 and 18, respectively, of transistors 14 and 12 by resistor 22. The Zener diode 23 together with a capacitor 24 in parallel thereto couple the collector 21 of transistor 14 to ground. Zener diode 6 operates as a switch. Capacitor 24 is a storage capacitor which charges up to 20 volts and is clamped by the Zener diode 23 at 20 volts.

The internal and external signals are combined on the base of transistor 2. This transistor is cut off in the absence of blanking signals and it collector 4 is at +35 volts. The zener diode 6 is then in the conducting or "on" state. The common point of anode 7 of zener diode 6, cathode 8 of diode 9 and resistor 20 is slightly positive in the absence of a blanking signal. Since the AGC voltage from the receiver is normally from −1 to −5 volts on the bases of transistors 12 and 14, diode 9 is cut off, and the AGC input signal at the bases 11 and 13 of transistors 12 and 14 and the AGC output is taken off at resistor 22. However, when a blanking pulse, which is positive, is present on the base 1 of transistor 2, transistor 2 conducts the collector 4 dropping to a low positive voltage and the zener diode 6 changes to the non-conductive or "off" state. When the blanking pulse turns off the zener diode 6, the diode 9 conducts and the negative voltage from the −108 volt source causes the bases 11 and 13 of transistors 12 and 14 to go negative to approximately −10 volts. The emitters 14 and 18 of these transistors follow this voltage change and thereby provide a negative pulse on the AGC bus of approximately 15 volts, the width of the pulse being equivalent to the width of the blanking pulse input. Transistors 12 and 14 are coupled in the complementary symmetry connection. Transistor 12 is a NPN transistor and transistor 14 is a PNP transistor. A negative-going input signal forward biases transistor 14 and causes it to conduct. A positive-going input signal forward biases transistor 12 and causes it to conduct. The purpose of using this complementary transistor combination in this circuit is to provide for a sharply defined blanking pulse output having a short rise and decay time. It is necessary because of the highly capacitive impedance of the AGC line of the IF amplifier. With the complementary transistor arrangement here shown, it is possible to obtain from the output of transistors 12 and 14 a more sharply defined blanking pulse wherein the width is controlled to a much greater degree of certainty than the prior art.

The circuit of this invention has been successfully reduced to practice with the following parameters.

CR1—Diode, Zener 30 volts—1N1782
CR2—Diode—1N459
CR3—Diode, Zener 20 volts—1N1778
R1—Resistor—1.8K ohms
R2—Resistor—1K ohms
R3—Resistor—6.2K ohms
R4—Resistor—5.6K ohms
R5—Resistor—68K ohms
Q1—Transistor—2N338
Q2—Transistor—2N1131
Q3—Transistor—2N338
B+ —120 volts
B+ —108 volts While I have described above the principles of my invention in connection with specific apparatus, it is to be clearly understood that this description is made only by way of example and not as a limitation to the scope of my invention as set forth in the objects thereof and in the accompanying claims.

I claim:

1. A switching circuit responsive to a first pulse signal and a second varying signal comprising first, second and third transistors, each said transistor having at least a collector element, and an emitter element, means coupling said first signal to the inputs of said first transistor, means coupling said second signal to the inputs of said second and third transistors, first and second diodes, means coupling the anode of said first diode to the cathode of said second diode, means coupling the cathode of said first diode to the collector element of said first transistor, and means coupling the anode of said second diode to the inputs of said second and third transistors, a source of positive voltage applied to the junction of said first transistor and said first diode, means coupling a negative voltage to the junction of said first and second diodes, said negative voltage being less than said positive voltage whereby said diode junction is slightly positive in the absence of said first signals with said first diode conducting and said second diode nonconducting and on the application of said first signal to said first transistor, said first diode becomes non-conductive and said second diode conducts and a first negative pulse output is produced from said second and third transistors having a width equal to the width of said first pulse signal, and in the absence of said first signal and the application of said second signal to said second and third transistor, said first diode conducts and renders said second diode non-conductive whereby said second signal causes said second and third transistors to produce a second output from the emitter elements thereof.

2. A switching circuit responsive to a first pulse signal and a second varying signal comprising first, second and third transistors, each said transistor having at least a collector element, and an emitter element, means coupling said first signal to the input of said first transistor, means coupling said second signal to the inputs of said second and third transistors, a source of negative voltage, first and second diodes, means coupling the anode of said first diode to the cathode of said second diode, means coupling said negative voltage to the junction of said anode of said first diode and the cathode of said second diode, a source of positive voltage coupled to the junction of said first diode and said first transistor, said positive voltage being greater than said negative voltage to maintain said junction slightly positive in the absence of said first pulse signal, means coupling the cathode of said first diode to the collector element of said first transistor, means coupling the anode of said second diode to the inputs of said second and third transistors, means coupling said source of negative voltage to the anode of said first diode and the cathode of said second diode whereby on the application of said first signal to said first transistor, said first diode becomes non-conductive and said second diode conducts to produce a negative potential on said second and third transistors and a first negative pulse output is produced from said second and third transistors having a width equal to the width of said first pulse signal, and in the absence of said first signal and the application of said second signal to said second and third transistor, said first diode conducts, said second diode becomes non-conductive whereby said second signal causes said second and third transistors to produce a second output from the emitter elements thereof.

3. A switching circuit responsive to a first pulse signal and a second varying signal comprising first, second and third transistors, each said transistor having at least a collector element and an emitter element means coupling said first signal to input of said first transistor, means coupling said second signal to the inputs of said second and third transistors, a source of negative voltage, first and second diodes, means coupling the anode of said first diode to the cathode of said second diode, means coupling the cathode of said first diode to the collector element of said first transistor, means coupling a positive voltage to the connection of said first diode and said first transistor, means coupling the anode of said second diode to the inputs of said second and third transistors, means coupling said source of negative voltage to the anode of said first diode and the cathode of said second diode whereby in the absence of said first signal said first diode conducts and said junction is maintained slightly positive and on the application of said first signal to said first transistor, said first diode becomes non-conductive and said negative voltage passes through said second diode to produce a negative potential on said second and third transistor and a first negative pulse output is produced from said second and third transistors having a width equal to the width of said first pulse signal, and in the absence of said first signal and the application of said second signal to said second and third transistors, said first diode conducts and renders said second diode non-conductive whereby said second signal causes said second and third transistors to produce a second output from the emitter elements thereof.

4. A switching circuit responsive to a first pulse signal and a second continuous varying signal comprising first, second and third transistors, each comprising base, emitter and collector elements, means coupling said first signal to the base element of said first transistor, means coupling said second signal to the base elements of said second and third transistors, means coupling a positive voltage to the collector of said first transistor, a source of negative voltage, first and second diodes, means coupling the anode of said first diode to the cathode of said second diode, means coupling the cathode of said first diode to the collector element of said first transistor, means coupling the emitter element of said first transistor to ground means coupling the anode of said second diode to the base elements of said second and third transistors, means coupling said negative voltage to the collector element of said second transistor, means coupling the emitter element of said second transistor to the emitter element of said third transistor resistive means coupling said source of negative voltage to the anode of said first diode and the cathode of said second diode whereby said junction is maintained slightly positive and on the application of said first signal to said first transistor, said first diode becomes non-conductive and said negative voltage passes through said second diode to produce a negative potential on the base elements of said second and third transistors and a first negative pulse output is produced from the emitter elements of said second and third transistors having a width equal to the width of said first pulse signal, and in the absence of said first signal and the application of said second signal to said second and third transistors, said first diode conducts and renders said second diode non-conductive whereby said second signal causes said second and third transistors to produce a second output from the emitter elements thereof.

5. A switching circuit responsive to a first pulse signal and a second continuous varying signal comprising first, second and third transistors, each comprising base, emitter and collector elements, means coupling said first signal to the base element of said first transistor, means coupling the emitter element of said first transistor to ground, means coupling said second signal to the base elements of said second third transistors, means coupling together the emitter elements of said second and third transistors, a source of positive voltage coupled to the collector element of said first transistor, a source of negative voltage coupled to the collector element of said second transistor and the emitter elements of said second and third transistors, first and second diodes, means coupling the anode of said first diode to the cathode of said second diode, means coupling the cathode of said first diode to the collector elements of said first transistor, means coupling the anode of said second diode to the base elements of said second and third transistors, means coupling the collector of said third transistor to ground, resistive means coupling said source of negative voltage to the anode of said first diode and the cathode of said second diode whereby said junction is maintained slightly positive and on the application of said first signal to said first transistor, said first diode becomes non-conductive and said second diode conducts said negative voltage to produce a negative potential on the base elements of said second and third transistors and a first negative pulse output is produced from the emitter elements of said second and third transistors having a width equal to the width of said first pulse signal, and in the absence of said first pulse signal and the application of said second signal to said second and third transistors, said first diode conducts said positive voltage therethrough to the cathode of said second diode and renders said second diode non-conductive whereby said second signal causes said second and third transistors to produce a second output therefrom.

6. A switching circuit responsive to first input signals and second input varying signals comprising a first transistor, means coupling said first signals to the input of said first transistor, second and third transistors, means coupling said second signals to the inputs of said second and third transistors, first and second diodes, means coupling said first diode to said second diode, a source of positive potential applied to the junction of said first diode and said first transistor, a source of negative potential applied to the junction of said first and second diodes of a voltage level less than that of the voltage level of said positive potential whereby said junction is slightly positive in the absence of said first pulse signals when said first diode is conducting and said second diode is nonconducting and said junction becomes negative when said first pulse signal appears at the input of said first transistor to cause said first diode to become nonconducting and said second diode conducting, a first output is produced from said second and third transistors when said junction is in the negative condition and a second output is produced from said second and third transistors responsive to said second signals when said junction is in the positive condition.

References Cited in the file of this patent

UNITED STATES PATENTS

| | | |
|---|---|---|
| 2,597,796 | Kindall | May 20, 1952 |
| 2,888,579 | Wanlass | May 26, 1959 |
| 2,916,636 | Wanlass | Dec. 8, 1959 |
| 2,965,767 | Wanlass | Dec. 20, 1960 |
| 3,031,588 | Hilsenrath | Apr. 24, 1962 |